US008724040B2

(12) United States Patent
Sumi

(10) Patent No.: US 8,724,040 B2
(45) Date of Patent: May 13, 2014

(54) PIXEL STRUCTURES OF 3D DISPLAY DEVICES

(75) Inventor: Naoki Sumi, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 264 days.

(21) Appl. No.: 13/287,818

(22) Filed: Nov. 2, 2011

(65) Prior Publication Data

US 2013/0106678 A1 May 2, 2013

(51) Int. Cl.
*G02F 1/1343* (2006.01)

(52) U.S. Cl.
USPC ............................. 349/15; 349/139; 349/144

(58) Field of Classification Search
None
See application file for complete search history.

(56) References Cited

U.S. PATENT DOCUMENTS

| 5,056,912 | A | * | 10/1991 | Hamada et al. | 353/38 |
|---|---|---|---|---|---|
| 5,602,658 | A | * | 2/1997 | Ezra et al. | 349/95 |
| 2004/0012726 | A1 | * | 1/2004 | Kano et al. | 349/43 |
| 2005/0083246 | A1 | * | 4/2005 | Saishu et al. | 345/1.1 |
| 2008/0278641 | A1 | * | 11/2008 | Uehara | 349/15 |
| 2009/0079919 | A1 | * | 3/2009 | Niioka et al. | 349/113 |
| 2009/0096726 | A1 | * | 4/2009 | Uehara et al. | 345/84 |
| 2009/0167846 | A1 | * | 7/2009 | Niioka et al. | 348/54 |
| 2011/0050683 | A1 | * | 3/2011 | Yun et al. | 345/214 |
| 2011/0149392 | A1 | * | 6/2011 | Liao et al. | 359/463 |
| 2011/0304601 | A1 | * | 12/2011 | Niioka et al. | 345/209 |
| 2012/0200795 | A1 | * | 8/2012 | Takatori | 349/33 |
| 2013/0050815 | A1 | * | 2/2013 | Fukushima et al. | 359/462 |

FOREIGN PATENT DOCUMENTS

JP 2001-281649 A * 10/2001

* cited by examiner

*Primary Examiner* — Mike Stahl
(74) *Attorney, Agent, or Firm* — Liu & Liu

(57) ABSTRACT

In an embodiment of the invention, a pixel structure of a 3D display device is provided. The pixel structure of a 3D display device includes a thin film transistor (TFT) substrate including a pixel, wherein the pixel is divided into a first subpixel strip and a second subpixel strip, and each subpixel strip includes a plurality of subpixels, wherein each subpixel is divided into a first area and a second area including one contact hole located in one of the first area and the second area, wherein the locations of the contact holes in the first subpixel strip and the second subpixel strip are the same or the location of the contact holes in the first subpixel strip is a mirror image of the location of the contact holes in the second subpixel strip, and a light modulating element formed on the pixel.

9 Claims, 15 Drawing Sheets

PIXEL STRUCTURES OF 3D DISPLAY DEVICES

BACKGROUND OF THE INVENTION

1. Field of the Invention

The invention relates to a pixel structure of a 3D display device, and in particular to a pixel structure of a 3D display device capable of reducing 3D moiré and binocular rivalry.

2. Description of the Related Art

One of the serious problems of conventional 3D displays (auto-stereoscopic type barrier/lenticular 3D displays) is 3D moiré. For example, 3D moiré looks like non-uniform screen brightness with vertical stripe patterns. It is basically caused by the interaction of a pixel array and a 3D barrier pattern or 3D lenticular films. 3D moiré is really an annoying defect when we see 3D images on an LCD screen.

One prior art uses "defocusing lens idea" and "zigzag pixel layout or slanted pixel" to reduce the 3D moiré issue. But it is not perfect enough and/or it will lead to additional drawbacks of 3D cross talk.

BRIEF SUMMARY OF THE INVENTION

One embodiment of the invention provides a pixel structure of a 3D display device, comprising: a thin film transistor (TFT) substrate comprising a first pixel and a second pixel, wherein the first pixel is divided into a first subpixel strip and a second subpixel strip, and the second pixel is divided into a third subpixel strip and a fourth subpixel strip, and each subpixel strip comprises a plurality of subpixels, wherein each subpixel is divided into a first area and a second area comprising one contact hole located in one of the first area and the second area, wherein the locations of the contact holes in the first subpixel strip and the second subpixel strip are the same or the location of the contact holes in the first subpixel strip is a mirror image of the location of the contact holes in the second subpixel strip, and the locations of the contact holes in the third subpixel strip and the fourth subpixel strip are the same or the location of the contact holes in the third subpixel strip is a mirror image of the location of the contact holes in the fourth subpixel strip, wherein the first subpixel strip and the third subpixel strip comprise right eye subpixels and the second subpixel strip and the fourth subpixel strip comprise left eye subpixels; a first light modulating element formed on the first pixel; and a second light modulating element formed on the second pixel. The first and second light modulating elements comprise a lens or a barrier with an aperture.

In the invention, the 3D moiré and binocular rivalry issues are effectively reduced by using a novel pixel design for a right eye pixel and left eye pixel. Specifically, the black parts (contact holes) in pixels are alternatively located in various pixel areas along horizontal and vertical directions so as to uniform the visual brightness of the right eye and left eye.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
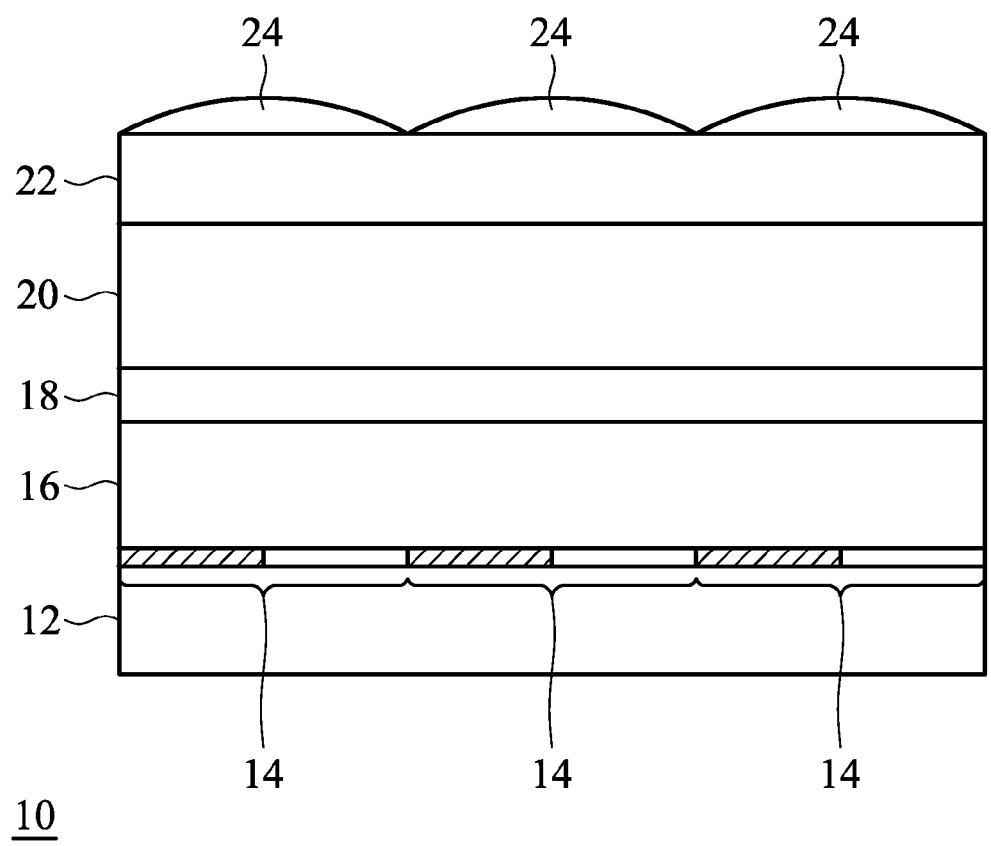
FIG. 1 shows a cross-section view of a 3D display device according to an embodiment of the invention.

According to one embodiment of the invention, referring to FIG. 1, a 3D display device is provided. The 3D display device 10 comprises a TFT substrate 12 comprising a pixel 14, a color filter 16 formed on the pixel 14, a polarizer 18 formed on the color filter 16, a glue 20 coated on the polarizer 18, a transparent material layer 22, for example a PET layer, adhered to the polarizer 18 through the glue 20, and a modulating element formed on the transparent material layer 22, wherein the modulating element may be a lens 24 or a barrier 26 (in FIG. 2). In this embodiment, a fixed type lenticular lens is described, but switchable lens cells that can be turned ON/OFF by a voltage apply for LC cells are still available.

Figure 2:
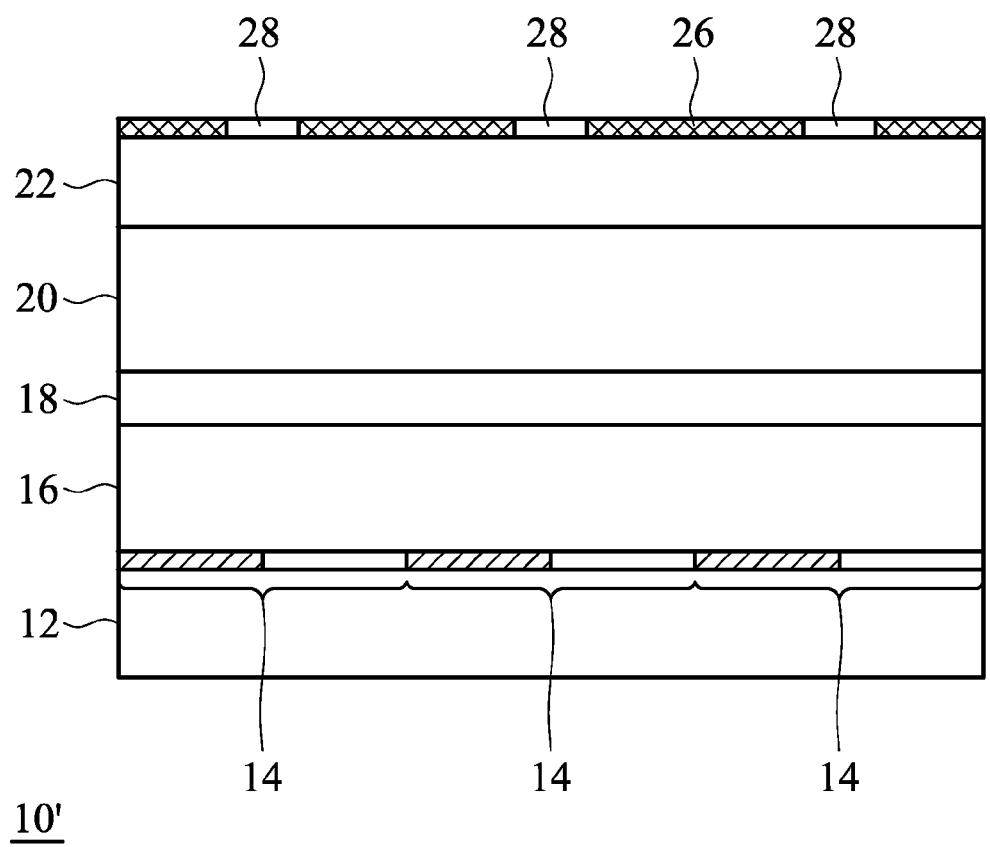
FIG. 2 shows a cross-section view of a 3D display device according to an embodiment of the invention.

According to one embodiment of the invention, referring to FIG. 2, a 3D display device is provided. The 3D display device 10' comprises a TFT substrate 12 comprising a pixel 14, a color filter 16 formed on the pixel 14, a polarizer 18 formed on the color filter 16, a glue 20 coated on the polarizer 18, a transparent material layer 22, for example a PET layer, adhered to the polarizer 18 through the glue 20, and a barrier 26 with apertures 28 formed on the transparent material layer 22. In this embodiment, a fixed type barrier is described, but switchable barrier cells that can be turned ON/OFF by a voltage apply for LC cells are still available. In this embodiment, the 3D barrier is located on a LCD. But the barrier can be located "under" a LCD.

Figure 3:
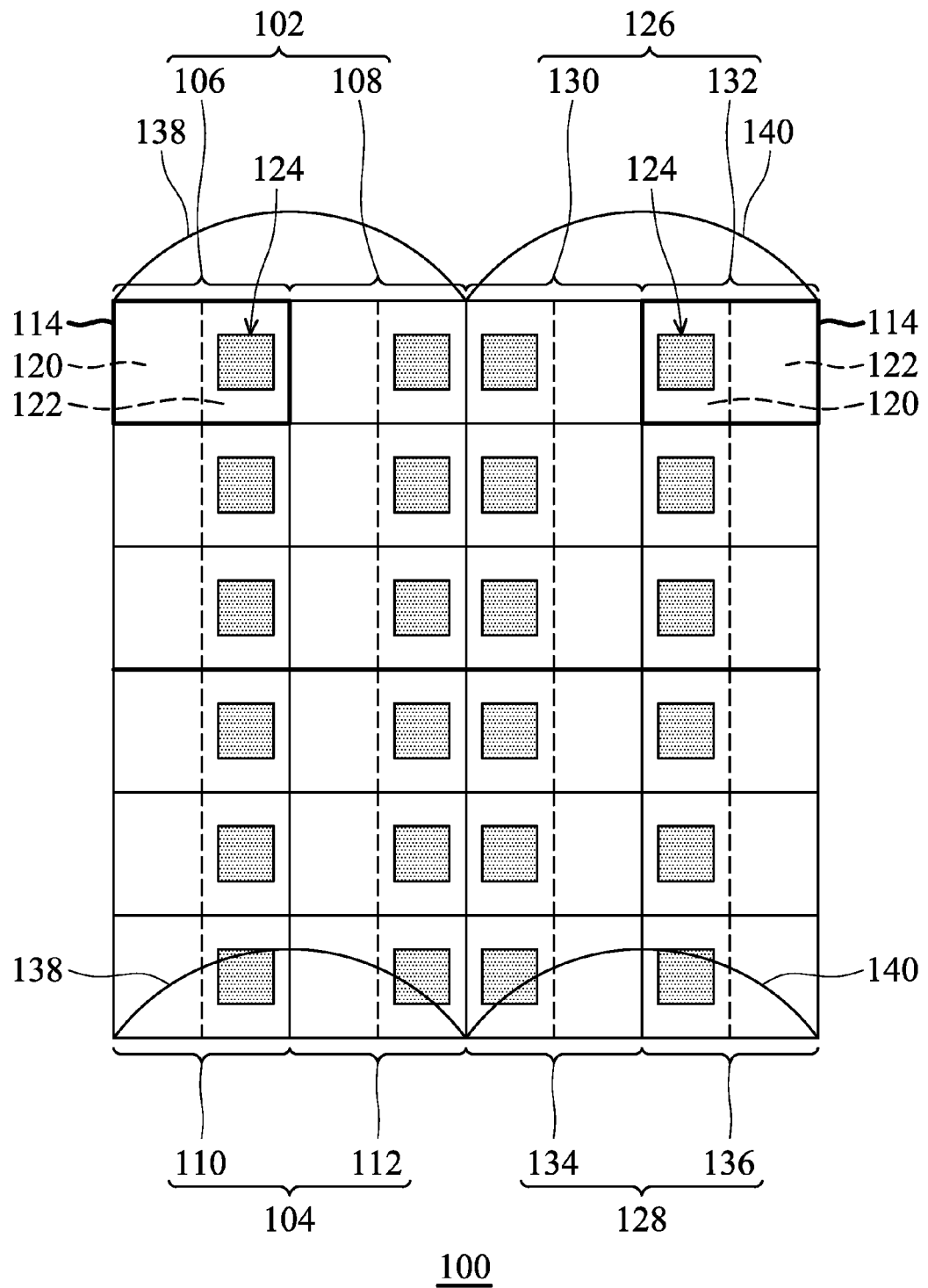
FIG. 3 shows a top view of a pixel structure of a 3D display device according to an embodiment of the invention.

According to one embodiment of the invention, referring to FIG. 3, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the first subpixel strip 106 and the second subpixel strip 108 are the same. The locations of the contact holes 124 in the third subpixel strip 130 and the fourth subpixel strip 132 are the same. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 3, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the fifth subpixel strip 110 and the sixth subpixel strip 112 are the same. The locations of the contact holes 124 in the seventh subpixel strip 134 and the eighth subpixel strip 136 are the same. Additionally, the location of the contact holes 124 in the first pixel 102 is a mirror image of the location of the contact holes 124 in the second pixel 126. The location of the contact holes 124 in the third pixel 104 is a mirror image of the location of the contact holes 124 in the fourth pixel 128. The locations of the contact holes 124 in the first pixel 102 and the third pixel 104 are the same. The locations of the contact holes 124 in the second pixel 126 and the fourth pixel 128 are the same.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 3, the contact holes 124 of the first subpixel strip 106, the second subpixel strip 108, the fifth subpixel strip 110 and the sixth subpixel strip 112 are located in the second area 122 of the subpixels 114. The contact holes 124 of the third subpixel strip 130, the fourth subpixel strip 132, the seventh subpixel strip 134 and the eighth subpixel strip 136 are located in the first area 120 of the subpixels 114.

Figure 4:
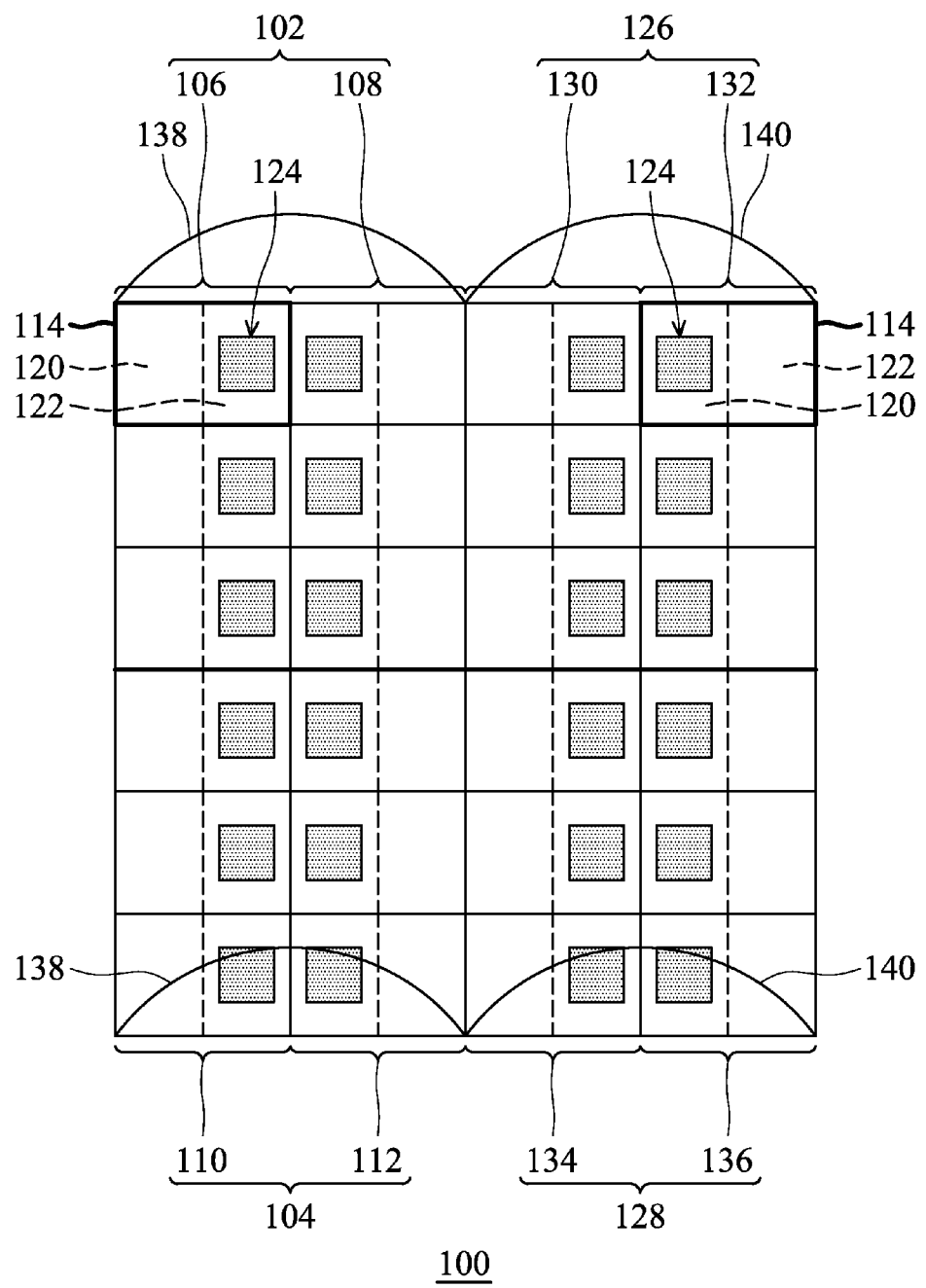
FIG. 4 shows a top view of a pixel structure of a 3D display device according to an embodiment of the invention.

According to one embodiment of the invention, referring to FIG. 4, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 4, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are the same. The locations of the contact holes 124 in the third pixel 104 and the fourth pixel 128 are the same. The locations of the contact holes 124 in the first pixel 102 and the third pixel 104 are the same. The locations of the contact holes 124 in the second pixel 126 and the fourth pixel 128 are the same.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 4, the contact holes 124 of the first subpixel strip 106, the third subpixel strip 130, the fifth subpixel strip 110 and the seventh subpixel strip 134 are located in the second area 122 of the subpixels 114. The contact holes 124 of the second subpixel strip 108, the fourth subpixel strip 132, the sixth subpixel strip 112 and the eighth subpixel strip 136 are located in the first area 120 of the subpixels 114.

Figure 5:
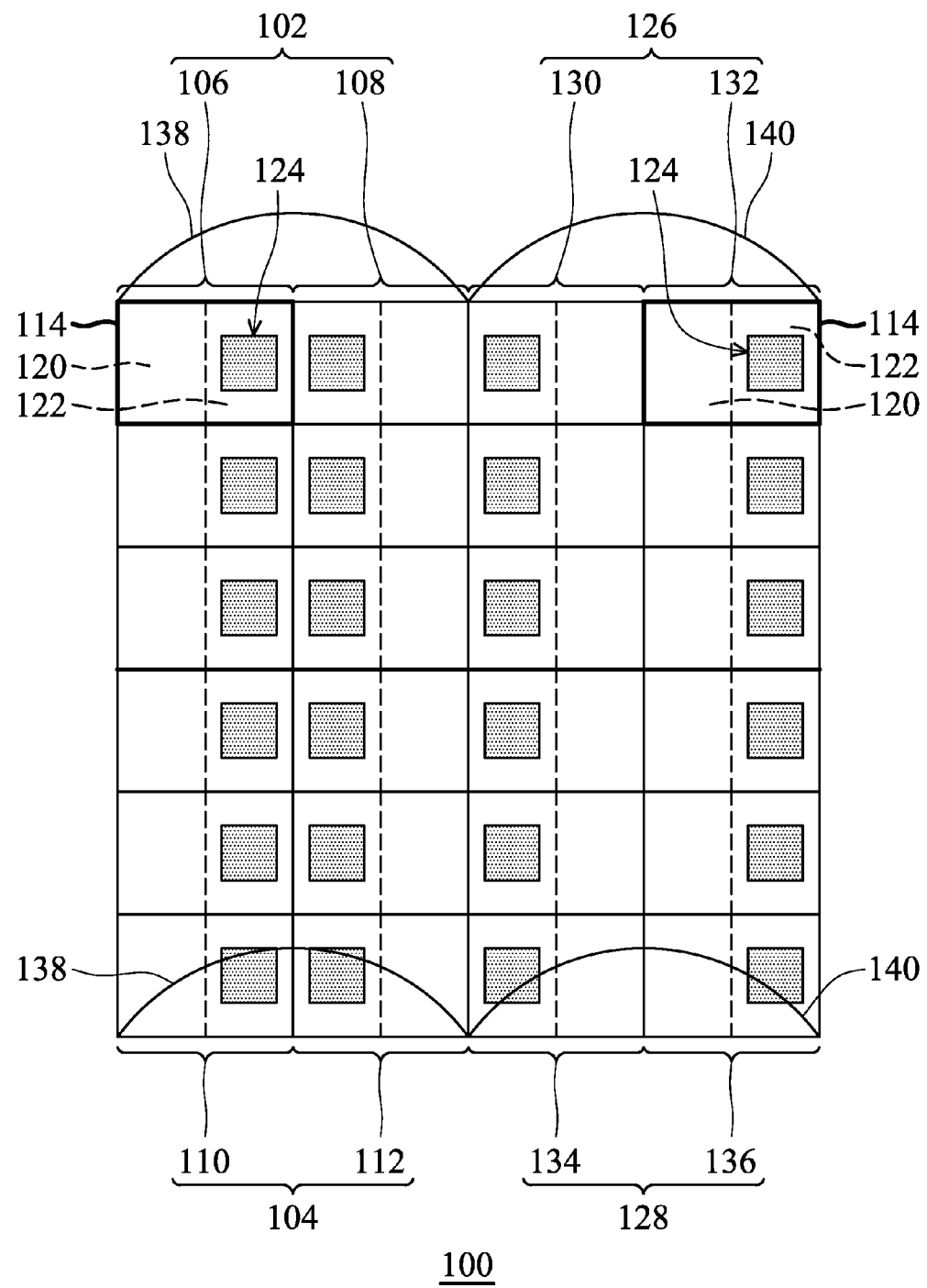
FIG. 5 shows a top view of a pixel structure of a 3D display device according to an embodiment of the invention.

According to one embodiment of the invention, referring to FIG. 5, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 5, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are different. The locations of the contact holes 124 in the third pixel 104 and the fourth pixel 128 are different. The locations of the contact holes 124 in the first pixel 102 and the third pixel 104 are the same. The locations of the contact holes 124 in the second pixel 126 and the fourth pixel 128 are the same.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 5, the contact holes 124 of the first subpixel strip 106, the fourth subpixel strip 132, the fifth subpixel strip 110 and the eighth subpixel strip 136 are located in the second area 122 of the subpixels 114. The contact holes 124 of the second subpixel strip 108, the third subpixel strip 130, the sixth subpixel strip 112 and the seventh subpixel strip 134 are located in the first area 120 of the subpixels 114.

Figure 6:
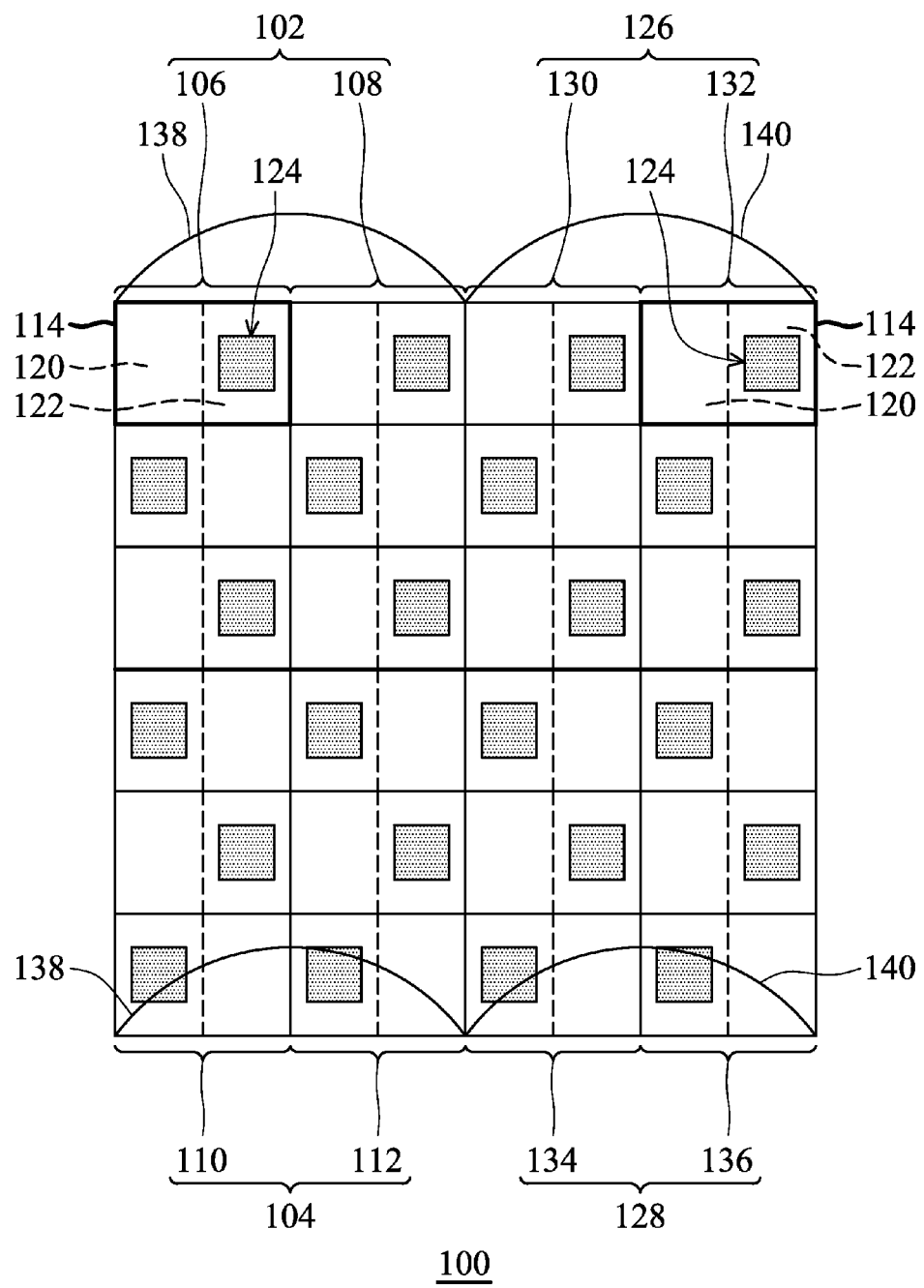
FIG. 6 shows a top view of a pixel structure of a 3D display device according to an embodiment of the invention.

According to one embodiment of the invention, referring to FIG. 6, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the first subpixel strip 106 and the second subpixel strip 108 are the same. The locations of the contact holes 124 in the third subpixel strip 130 and the fourth subpixel strip 132 are the same. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 6, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the fifth subpixel strip 110 and the sixth subpixel strip 112 are the same. The locations of the contact holes 124 in the seventh subpixel strip 134 and the eighth subpixel strip 136 are the same. Additionally, the locations of the contact holes 124 in the first pixel 102 and the second pixel 126 are the same. The locations of the contact holes 124 in the third pixel 104 and the fourth pixel 128 are the same. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 6, two of the contact holes 124 of each of the first subpixel strip 106, the second subpixel strip 108, the third subpixel strip 130 and the fourth subpixel strip 132 and one of the contact holes 124 of each of the fifth subpixel strip 110, the sixth subpixel strip 112, the seventh subpixel strip 134 and the eighth subpixel strip 136 are located in the second area 122 of the subpixels 114. Two of the contact holes 124 of each of the fifth subpixel strip 110, the sixth subpixel strip 112, the seventh subpixel strip 134 and the eighth subpixel strip 136 and one of the contact holes 124 of each of the first subpixel strip 106, the second subpixel strip 108, the third subpixel strip 130 and the fourth subpixel strip 132 are located in the first area 120 of the subpixels 114.

Figure 7:
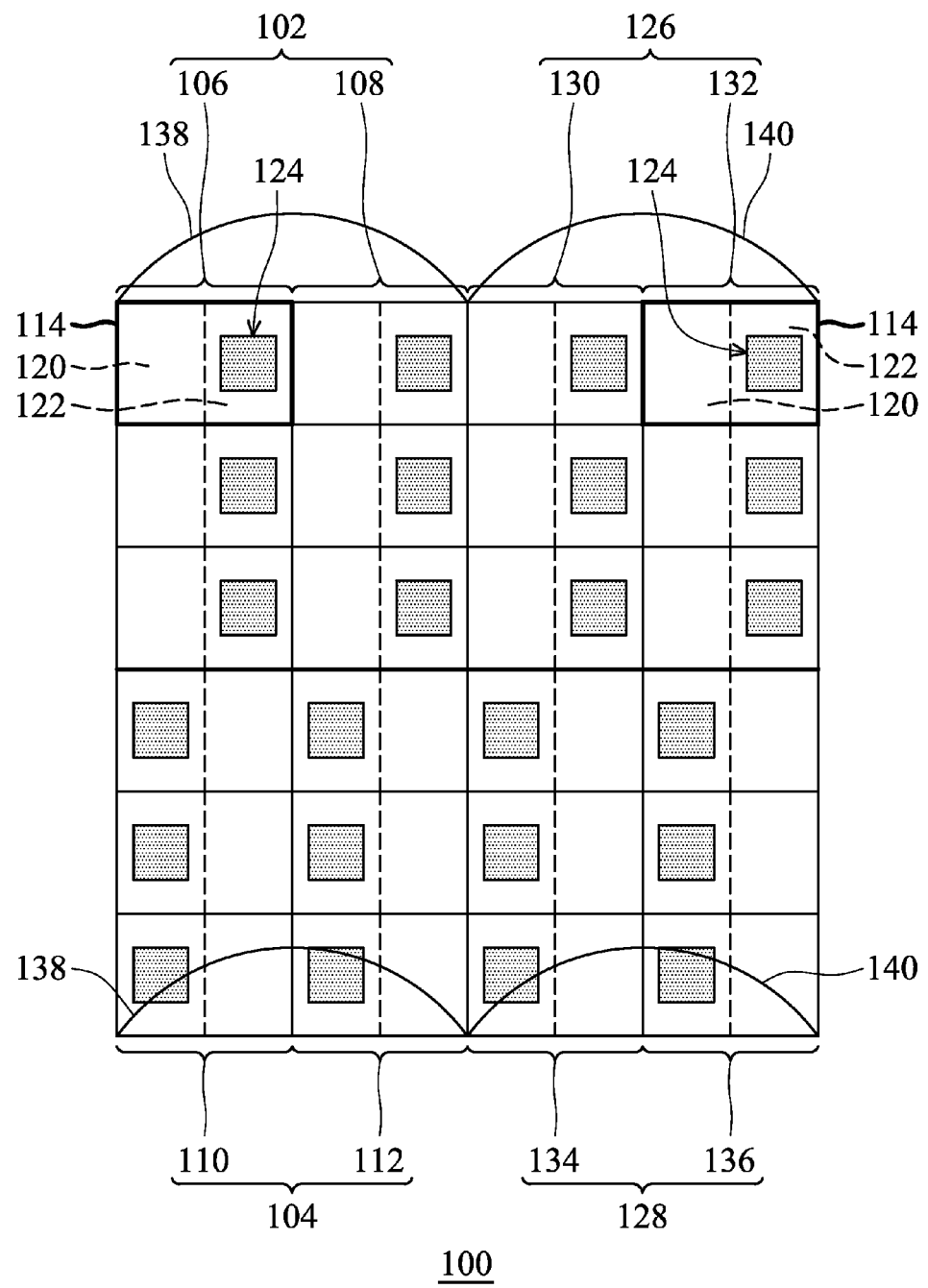
FIG. 7 shows a top view of a pixel structure of a 3D display device according to an embodiment of the invention.

According to one embodiment of the invention, referring to FIG. 7, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the first subpixel strip 106 and the second subpixel strip 108 are the same. The locations of the contact holes 124 in the third subpixel strip 130 and the fourth subpixel strip 132 are the same. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 7, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the fifth subpixel strip 110 and the sixth subpixel strip 112 are the same. The locations of the contact holes 124 in the seventh subpixel strip 134 and the eighth subpixel strip 136 are the same. Additionally, the locations of the contact holes 124 in the first pixel 102 and the second pixel 126 are the same. The locations of the contact holes 124 in the third pixel 104 and the fourth pixel 128 are the same. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 7, the contact holes 124 of the first subpixel strip 106, the second subpixel strip 108, the third subpixel strip 130 and the fourth subpixel strip 132 are located in the second area 122 of the subpixels 114. The contact holes 124 of the fifth subpixel strip 110, the sixth subpixel strip 112, the seventh subpixel strip 134 and the eighth subpixel strip 136 are located in the first area 120 of the subpixels 114.

Figure 8:
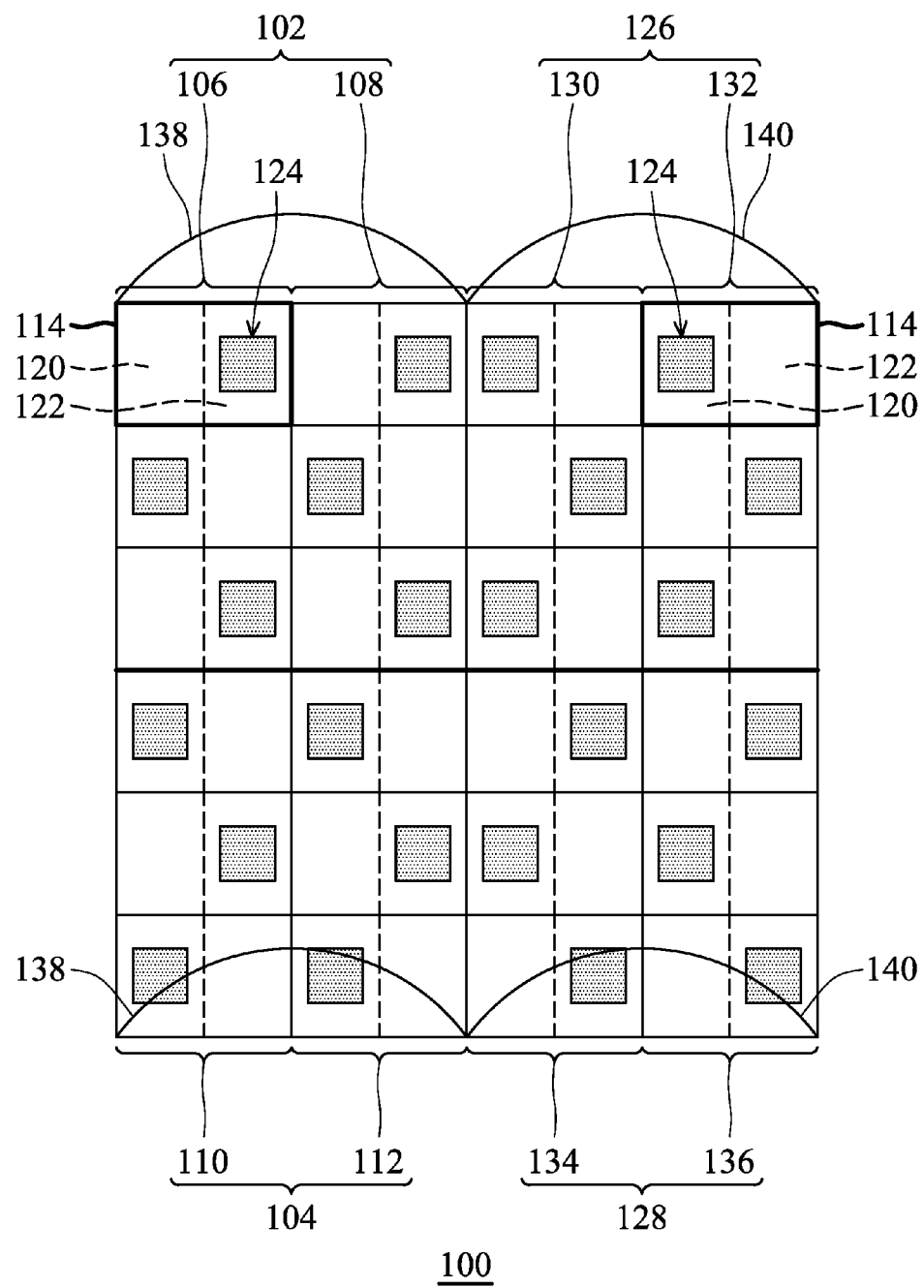
FIG. 8 shows a top view of a pixel structure of a 3D display device according to an embodiment of the invention.

According to one embodiment of the invention, referring to FIG. 8, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the first subpixel strip 106 and the second subpixel strip 108 are the same. The locations of the contact holes 124 in the third subpixel strip 130 and the fourth subpixel strip 132 are the same. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 8, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the fifth subpixel strip 110 and the sixth subpixel strip 112 are the same. The locations of the contact holes 124 in the seventh subpixel strip 134 and the eighth subpixel strip 136 are the same. Additionally, the location of the contact holes 124 in the first pixel 102 is a mirror image of the location of the contact holes 124 in the second pixel 126. The location of the contact holes 124 in the third pixel 104 is a mirror image of the location of the contact holes 124 in the fourth pixel 128. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 8, two of the contact holes 124 of each of the first subpixel strip 106, the second subpixel strip 108, the seventh subpixel strip 134 and the eighth subpixel strip 136 and one of the contact holes 124 of each of the third subpixel strip 130, the fourth subpixel strip 132, the fifth subpixel strip 110 and the sixth subpixel strip 112 are located in the second area 122 of the subpixels 114. Two of the contact holes 124 of each of the third subpixel strip 130, the fourth subpixel strip 132, the fifth subpixel strip 110 and the sixth subpixel strip 112 and one of the contact holes 124 of each of the first subpixel strip 106, the second subpixel strip 108, the seventh subpixel strip 134 and the eighth subpixel strip 136 are located in the first area 120 of the subpixels 114.

Figure 9:
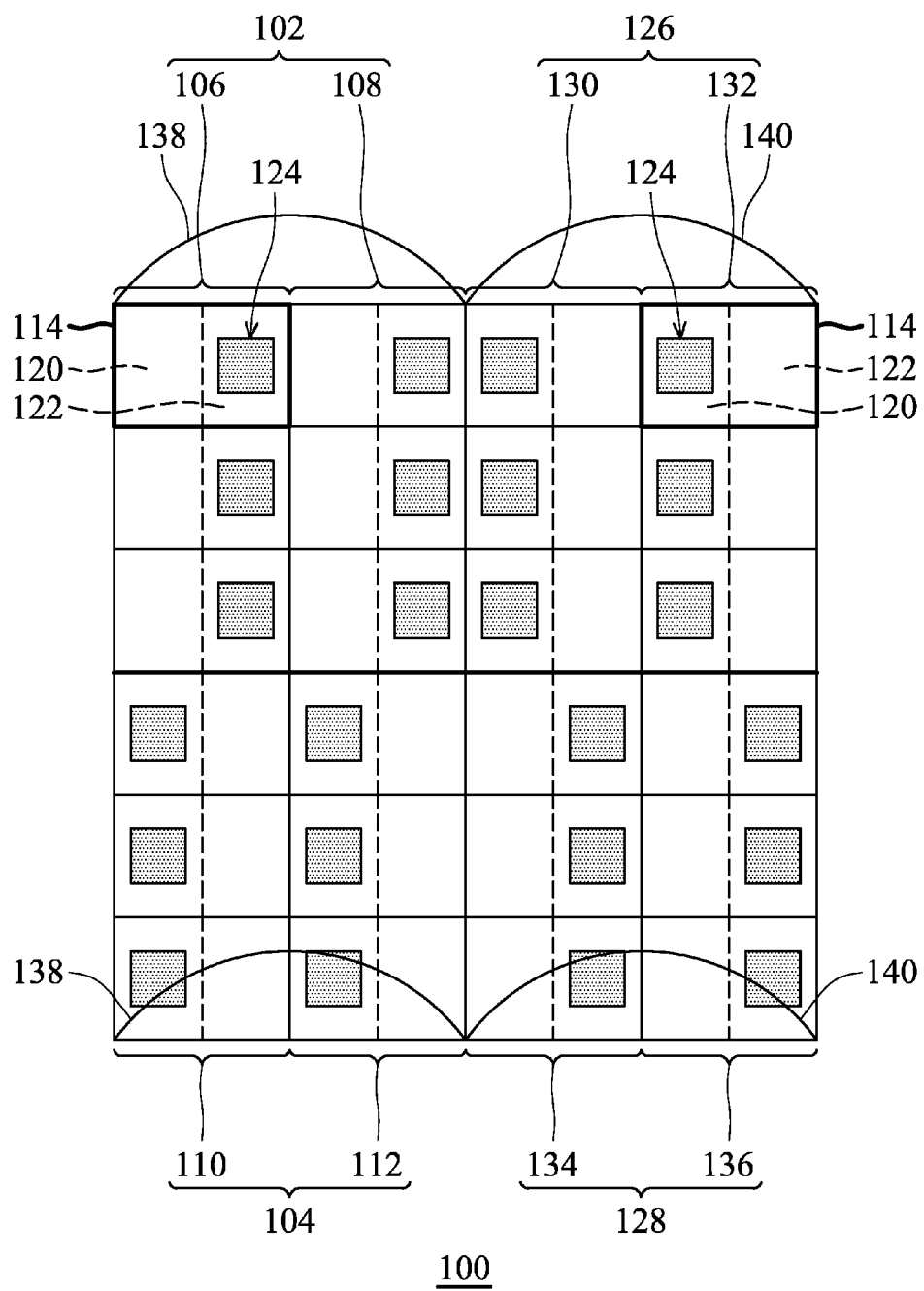
FIG. 9 shows a top view of a pixel structure of a 3D display device according to an embodiment of the invention.

According to one embodiment of the invention, referring to FIG. 9, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the first subpixel strip 106 and the second subpixel strip 108 are the same. The locations of the contact holes 124 in the third subpixel strip 130 and the fourth subpixel strip 132 are the same. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 9, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The locations of the contact holes 124 in the fifth subpixel strip 110 and the sixth subpixel strip 112 are the same. The locations of the contact holes 124 in the seventh subpixel strip 134 and the eighth subpixel strip 136 are the same. Additionally, the location of the contact holes 124 in the first pixel 102 is a mirror image of the location of the contact holes 124 in the second pixel 126. The location of the contact holes 124 in the third pixel 104 is a mirror image of the location of the contact holes 124 in the fourth pixel 128. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 9, the contact holes 124 of the first subpixel strip 106, the second subpixel strip 108, the seventh subpixel strip 134 and the eighth subpixel strip 136 are located in the second area 122 of the subpixels 114. The contact holes 124 of the third subpixel strip 130, the fourth subpixel strip 132, the fifth subpixel strip 110 and the sixth subpixel strip 112 are located in the first area 120 of the subpixels 114.

Figure 10:
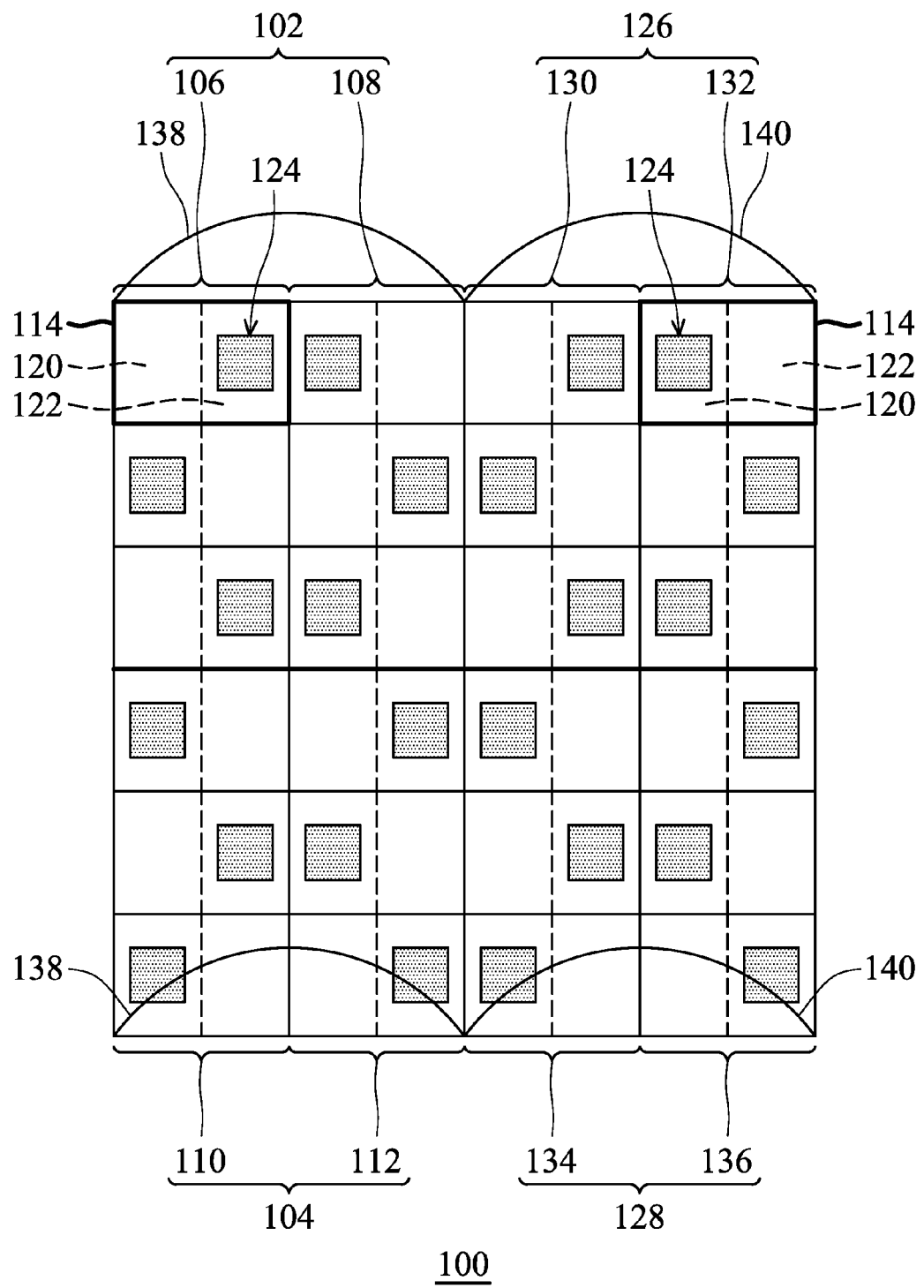
FIG. 10 shows a top view of a pixel structure of a 3D display device according to an embodiment of the invention.

According to one embodiment of the invention, referring to FIG. 10, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 10, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are the same. The locations of the contact holes 124 in the third pixel 104 and the fourth pixel 128 are the same. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 10, two of the contact holes 124 of each of the first subpixel strip 106, the third subpixel strip 130, the sixth subpixel strip 112 and the eighth subpixel strip 136 and one of the contact holes 124 of each of the second subpixel strip 108, the fourth subpixel strip 132, the fifth subpixel strip 110 and the seventh subpixel strip 134 are located in the second area 122 of the subpixels 114. Two of the contact holes 124 of each of the second subpixel strip 108, the fourth subpixel strip 132, the fifth subpixel strip 110 and the seventh subpixel strip 134 and one of the contact holes 124 of each of the first subpixel strip 106, the third subpixel strip 130, the sixth subpixel strip 112 and the eighth subpixel strip 136 are located in the first area 120 of the subpixels 114.

Figure 11:
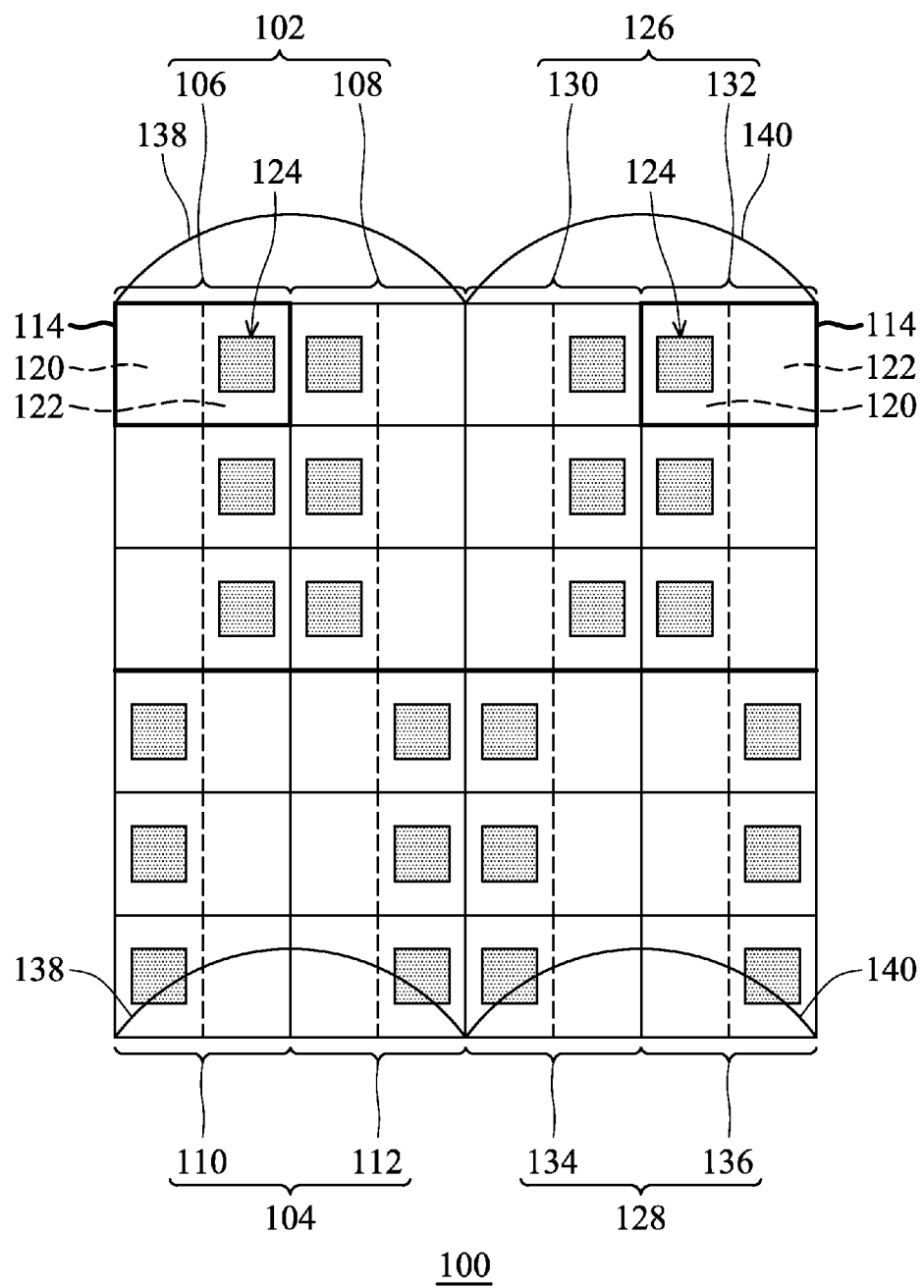
FIG. 11 shows a top view of a pixel structure of a 3D display device according to an embodiment of the invention.

According to one embodiment of the invention, referring to FIG. 11, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 11, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are the same. The locations of the contact holes 124 in the third pixel 104 and the fourth pixel 128 are the same. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 11, the contact holes 124 of the first subpixel strip 106, the third subpixel strip 130, the sixth subpixel strip 112 and the eighth subpixel strip 136 are located in the second area 122 of the subpixels 114. The contact holes 124 of the second subpixel strip 108, the fourth subpixel strip 132, the fifth subpixel strip 110 and the seventh subpixel strip 134 are located in the first area 120 of the subpixels 114.

Figure 12:
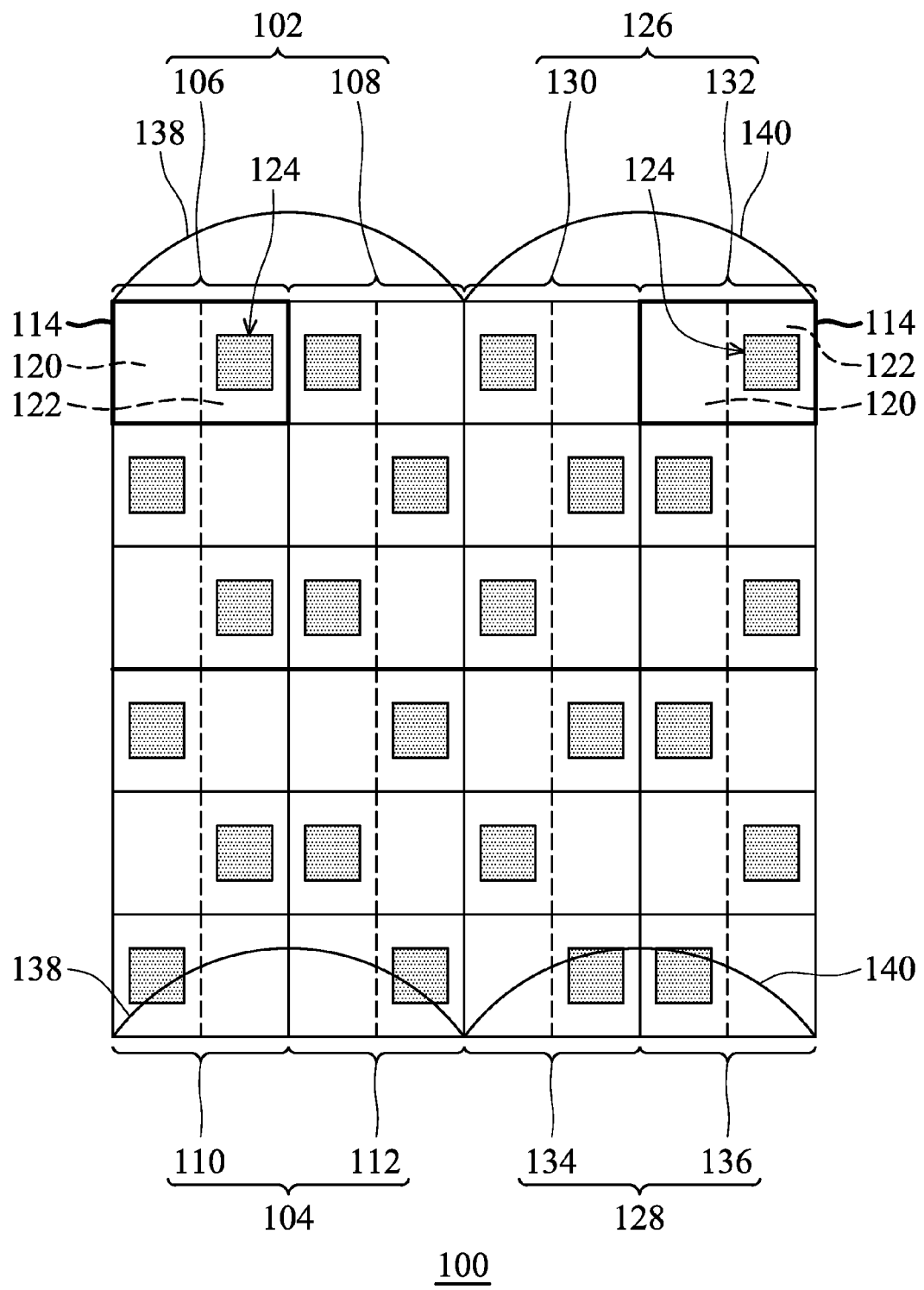
FIG. 12 shows a top view of a pixel structure of a 3D display device according to an embodiment of the invention.

According to one embodiment of the invention, referring to FIG. 12, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 12, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are different. The locations of the contact holes 124 in the third pixel 104 and the fourth pixel 128 are different. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 12, two of the contact holes 124 of each of the first subpixel strip 106, the fourth subpixel strip 132, the sixth subpixel strip 112 and the seventh subpixel strip 134 and one of the contact holes 124 of each of the second subpixel strip 108, the third subpixel strip 130, the fifth subpixel strip 110 and the eighth subpixel strip 136 are located in the second area 122 of the subpixels 114. Two of the contact holes 124 of each of the second subpixel strip 108, the third subpixel strip 130, the fifth subpixel strip 110 and the eighth subpixel strip 136 and one of the contact holes 124 of each of the first subpixel strip 106, the fourth subpixel strip 132, the sixth subpixel strip 112 and the seventh subpixel strip 134 are located in the first area 120 of the subpixels 114.

Figure 14:
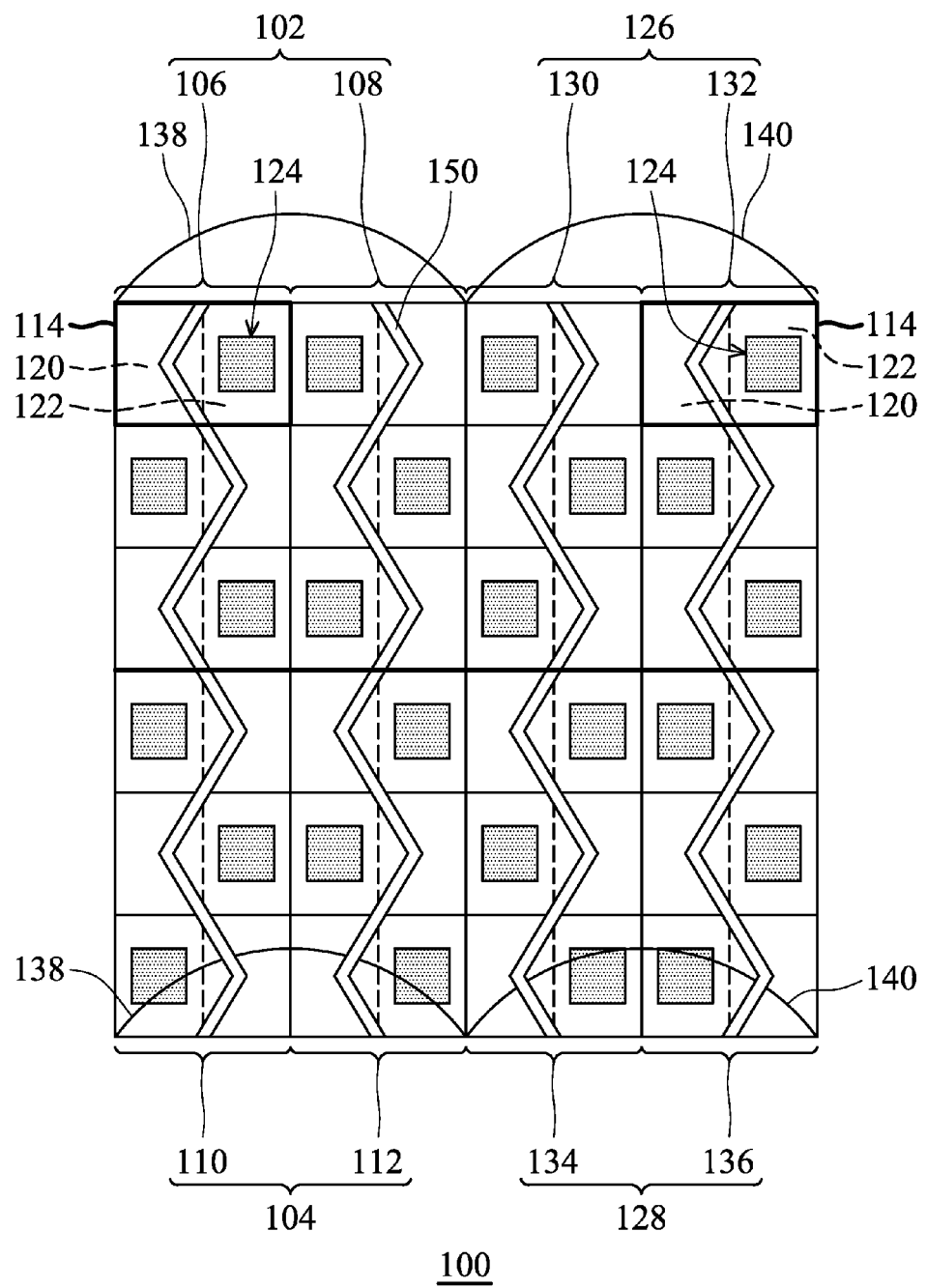
FIG. 14 shows a top view of an arrangement of a gate line according to an embodiment of the invention.

In this embodiment, the arrangement of a gate line 150 is adjusted in accordance with the location of the contact holes 124, as shown in FIG. 14.

Figure 13:
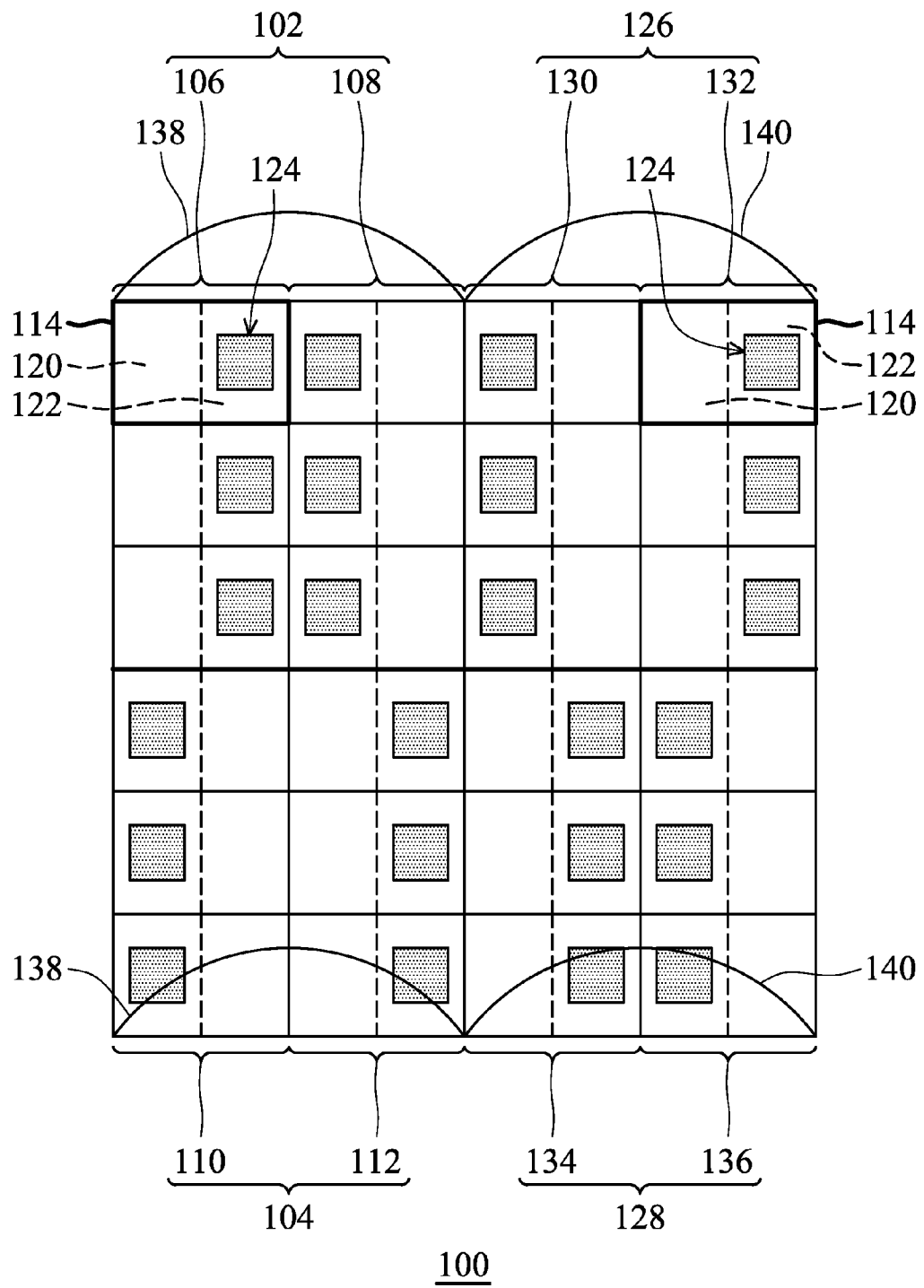
FIG. 13 shows a top view of a pixel structure of a 3D display device according to an embodiment of the invention.

According to one embodiment of the invention, referring to FIG. 13, a pixel structure of a 3D display device is provided. The pixel structure 100 comprises a thin film transistor (TFT) substrate (not shown). The thin film transistor (TFT) substrate comprises a first pixel 102 and a second pixel 126. The first pixel 102 is divided into a first subpixel strip 106 and a second subpixel strip 108. The second pixel 126 is divided into a third subpixel strip 130 and a fourth subpixel strip 132. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the first subpixel strip 106 is a mirror image of the location of the contact holes 124 in the second subpixel strip 108. The location of the contact holes 124 in the third subpixel strip 130 is a mirror image of the location of the contact holes 124 in the fourth subpixel strip 132. In this figure, the black parts "124" are mainly "contact holes" for easy explanation, but it is not limited to the contact hole. For example, TFT, gate busline, source busline, Cs (storage capacitor), light shielding pad and other black parts may be included in the black parts.

Still referring to FIG. 13, the thin film transistor (TFT) substrate comprises a third pixel 104 adjacent to the first pixel 102 and a fourth pixel 128 adjacent to the second pixel 126. The third pixel 104 is divided into a fifth subpixel strip 110 and a sixth subpixel strip 112. The fourth pixel 128 is divided into a seventh subpixel strip 134 and an eighth subpixel strip 136. Each subpixel strip comprises a plurality of subpixels 114, for example an R subpixel, a G subpixel and a B subpixel. Each subpixel 114 is divided into a first area 120 and a second area 122. Each subpixel 114 comprises one contact hole 124 located in one of the first area 120 and the second area 122. The location of the contact holes 124 in the fifth subpixel strip 110 is a mirror image of the location of the contact holes 124 in the sixth subpixel strip 112. The location of the contact holes 124 in the seventh subpixel strip 134 is a mirror image of the location of the contact holes 124 in the eighth subpixel strip 136. Additionally, the locations of the contact holes 124 in the first pixel 102 and the second pixel 126 are different. The locations of the contact holes 124 in the third pixel 104 and the fourth pixel 128 are different. The locations of the contact holes 124 in the first pixel 102 and the third pixel 104 are different. The locations of the contact holes 124 in the second pixel 126 and the fourth pixel 128 are different.

A first light modulating element 138 is formed on the first pixel 102 and the third pixel 104. A second light modulating element 140 is formed on the second pixel 126 and the fourth pixel 128. The first subpixel strip 106, the third subpixel strip 130, the fifth subpixel strip 110 and the seventh subpixel strip 134 comprise right eye subpixels. The second subpixel strip 108, the fourth subpixel strip 132, the sixth subpixel strip 112 and the eighth subpixel strip 136 comprise left eye subpixels.

Specifically, in FIG. 13, the contact holes 124 of the first subpixel strip 106, the fourth subpixel strip 132, the sixth subpixel strip 112 and the seventh subpixel strip 134 are located in the second area 122 of the subpixels 114. The contact holes 124 of the second subpixel strip 108, the third subpixel strip 130, the fifth subpixel strip 110 and the eighth subpixel strip 136 are located in the first area 120 of the subpixels 114.

Figure 15:
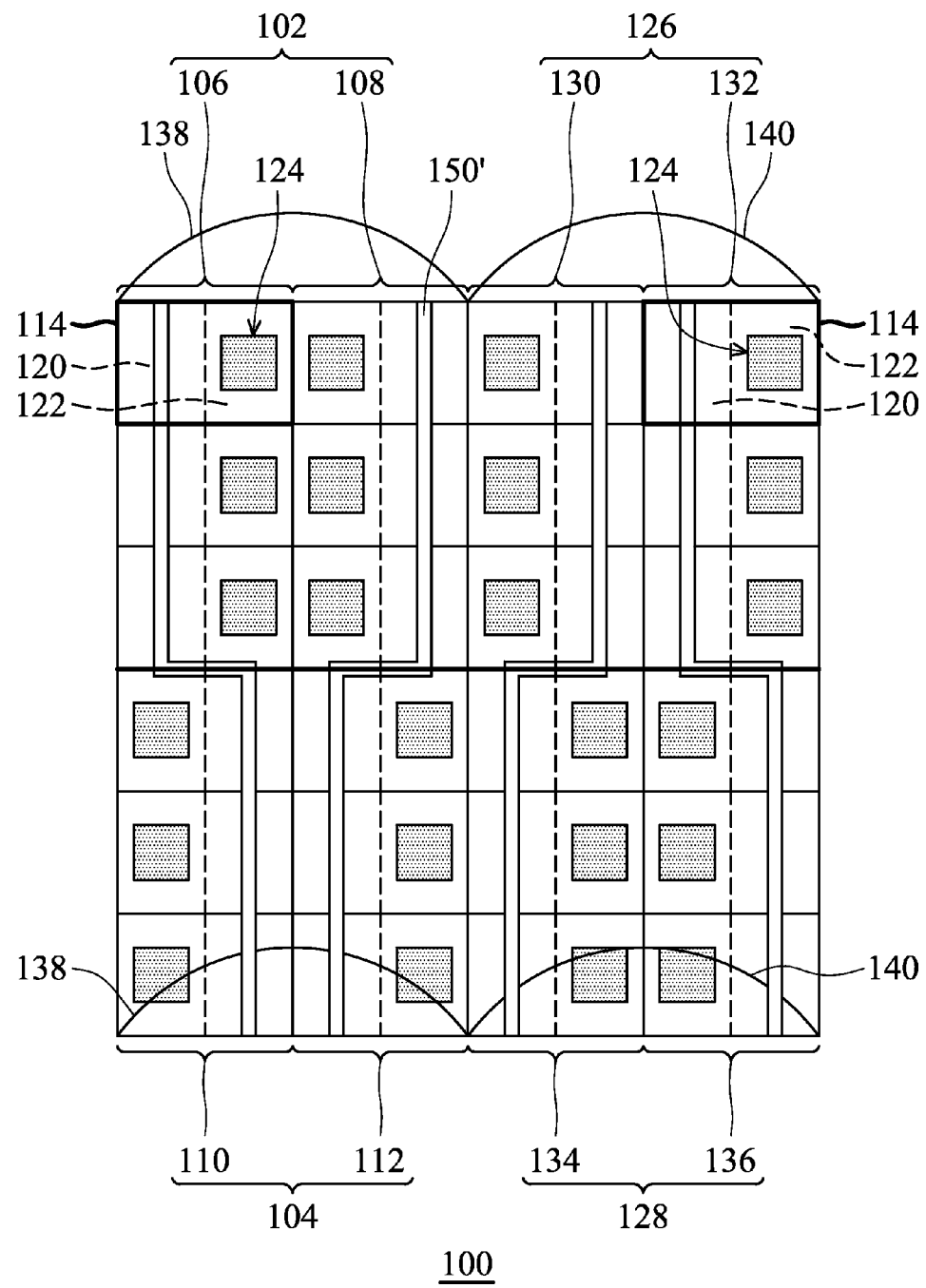
FIG. 15 shows a top view of an arrangement of a gate line according to an embodiment of the invention.

In this embodiment, the arrangement of a gate line 150' is adjusted in accordance with the location of the contact holes 124, as shown in FIG. 15.

In the invention, 2view type 3D display is described, but it is extended to a multiview type 3D display. The point is that the black parts are alternatively located along horizontal and/or vertical directions in specified eye pixels.

In the invention, the vertical RGB stripe layout is described, but it is no limited. A horizontal RGB stripe or other color filter layout is still possible.

In the invention, the 3D moiré and binocular rivalry issues are effectively reduced by using the novel pixel design for the right eye pixel and left eye pixel. Specifically, the black parts (contact holes) in pixels are alternatively located in various pixel areas along horizontal and vertical directions so as to uniform the visual brightness for the right eye and left eye.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure of a 3D display device, comprising:
a thin film transistor (TFT) substrate, comprising:
a first pixel and a second pixel, wherein the first pixel is divided into a first subpixel strip and a second subpixel strip, and the second pixel is divided into a third subpixel strip and a fourth subpixel strip, and each subpixel strip comprises a plurality of subpixels, wherein each subpixel is divided into a first area and a second area comprising one contact hole located in one of the first area and the second area, wherein the locations of the contact holes in the first subpixel strip and the second subpixel strip are the same, and the locations of the contact holes in the third subpixel strip and the fourth subpixel strip are the same, wherein the first subpixel strip and the third subpixel strip comprise right eye subpixels and the second subpixel strip and the fourth subpixel strip comprise left eye subpixels;
a third pixel adjacent to the first pixel and a fourth pixel adjacent to the second pixel, wherein the third pixel is divided into a fifth subpixel strip and a sixth subpixel strip, and the fourth pixel is divided into a seventh subpixel strip and an eighth subpixel strip, and each subpixel strip comprises a plurality of subpixels, wherein each subpixel is divided into a first area and a second area comprising one contact hole located in one of the first area and the second area, wherein the locations of the contact holes in the fifth subpixel strip and the sixth subpixel strip are the same, and the locations of the contact holes in the seventh subpixel strip and the eighth subpixel strip are the same, wherein the fifth subpixel strip and the seventh subpixel strip comprise right eye subpixels and the sixth subpixel strip and the eighth subpixel strip comprise left eye subpixels, wherein the location of the contact holes in the first pixel is a mirror image of the location of the contact holes in the second pixel and the location of the contact holes in the third pixel is a mirror image of the location of the contact holes in the fourth pixel, and the locations of the contact holes in the first pixel and the third pixel are different and the locations of the contact holes in the second pixel and the fourth pixel are different;
a first light modulating element formed on the first pixel and the third pixel; and
a second light modulating element formed on the second pixel and the fourth pixel.

2. The pixel structure of a 3D display device as claimed in claim 1, wherein two of the contact holes of each of the first subpixel strip, the second subpixel strip, the seventh subpixel strip and the eighth subpixel strip and one of the contact holes of each of the third subpixel strip, the fourth subpixel strip, the fifth subpixel strip and the sixth subpixel strip are located in the second area of the subpixels, and two of the contact holes of each of the third subpixel strip, the fourth subpixel strip, the fifth subpixel strip and the sixth subpixel strip and one of the contact holes of each of the first subpixel strip, the second subpixel strip, the seventh subpixel strip and the eighth subpixel strip are located in the first area of the subpixels.

3. The pixel structure of a 3D display device as claimed in claim 1, wherein the contact holes of the first subpixel strip, the second subpixel strip, the seventh subpixel strip and the eighth subpixel strip are located in the second area of the subpixels, and the contact holes of the third subpixel strip, the fourth subpixel strip, the fifth subpixel strip and the sixth subpixel strip are located in the first area of the subpixels.

4. A pixel structure of a 3D display device, comprising:
a thin film transistor (TFT) substrate, comprising:
a first pixel and a second pixel, wherein the first pixel is divided into a first subpixel strip and a second subpixel strip, and the second pixel is divided into a third subpixel strip and a fourth subpixel strip, and each subpixel strip comprises a plurality of subpixels, wherein each subpixel is divided into a first area and a second area comprising one contact hole located in one of the first area and the second area, wherein the location of the contact holes in the first subpixel strip is a mirror image of the location of the contact holes in the second subpixel strip, and the location of the contact holes in the third subpixel strip is a mirror image of the location of the contact holes in the fourth subpixel strip, wherein the first subpixel strip and the third subpixel strip comprise right eye subpixels and the second subpixel strip and the fourth subpixel strip comprise left eye subpixels;
a third pixel adjacent to the first pixel and a fourth pixel adjacent to the second pixel, wherein the third pixel is divided into a fifth subpixel strip and a sixth subpixel strip, and the fourth pixel is divided into a seventh subpixel strip and an eighth subpixel strip, and each subpixel strip comprises a plurality of subpixels, wherein each subpixel is divided into a first area and a second area comprising one contact hole located in one of the first area and the second area, wherein the location of the contact holes in the fifth subpixel strip is a mirror image of the location of the contact holes in the sixth subpixel strip, and the location of the contact holes in the seventh subpixel strip is a mirror image of the location of the contact holes in the eighth subpixel strip, wherein the fifth subpixel strip and the seventh subpixel strip comprise right eye subpixels and the sixth subpixel strip and the eighth subpixel strip comprise left eye subpixels, wherein the locations of the contact holes in the first pixel and the second pixel are the same and the locations of the contact holes in the third pixel and the fourth pixel are the same, and the locations of the contact holes in the first pixel and the third pixel are different and the locations of the contact holes in the second pixel and the fourth pixel are different;

a first light modulating element formed on the first pixel and the third pixel; and a second light modulating element formed on the second pixel and the fourth pixel.

5. The pixel structure of a 3D display device as claimed in claim 4, wherein two of the contact holes of each of the first subpixel strip, the third subpixel strip, the sixth subpixel strip and the eighth subpixel strip and one of the contact holes of each of the second subpixel strip, the fourth subpixel strip, the fifth subpixel strip and the seventh subpixel strip are located in the second area of the subpixels, and two of the contact holes of each of the second subpixel strip, the fourth subpixel strip, the fifth subpixel strip and the seventh subpixel strip and one of the contact holes of each of the first subpixel strip, the third subpixel strip, the sixth subpixel strip and the eighth subpixel strip are located in the first area of the subpixels.

6. The pixel structure of a 3D display device as claimed in claim 4, wherein the contact holes of the first subpixel strip, the third subpixel strip, the sixth subpixel strip and the eighth subpixel strip are located in the second area of the subpixels, and the contact holes of the second subpixel strip, the fourth subpixel strip, the fifth subpixel strip and the seventh subpixel strip are located in the first area of the subpixels.

7. A pixel structure of a 3D display device, comprising:
a thin film transistor (TFT) substrate, comprising:
a first pixel and a second pixel, wherein the first pixel is divided into a first subpixel strip and a second subpixel strip, and the second pixel is divided into a third subpixel strip and a fourth subpixel strip, and each subpixel strip comprises a plurality of subpixels, wherein each subpixel is divided into a first area and a second area comprising one contact hole located in one of the first area and the second area, wherein the location of the contact holes in the first subpixel strip is a mirror image of the location of the contact holes in the second subpixel strip, and the location of the contact holes in the third subpixel strip is a mirror image of the location of the contact holes in the fourth subpixel strip, wherein the first subpixel strip and the third subpixel strip comprise right eye subpixels and the second subpixel strip and the fourth subpixel strip comprise left eye subpixels;

a third pixel adjacent to the first pixel and a fourth pixel adjacent to the second pixel, wherein the third pixel is divided into a fifth subpixel strip and a sixth subpixel strip, and the fourth pixel is divided into a seventh subpixel strip and an eighth subpixel strip, and each subpixel strip comprises a plurality of subpixels, wherein each subpixel is divided into a first area and a second area comprising one contact hole located in one of the first area and the second area, wherein the location of the contact holes in the fifth subpixel strip is a mirror image of the location of the contact holes in the sixth subpixel strip, and the location of the contact holes in the seventh subpixel strip is a mirror image of the location of the contact holes in the eighth subpixel strip, wherein the fifth subpixel strip and the seventh subpixel strip comprise right eye subpixels and the sixth subpixel strip and the eighth subpixel strip comprise left eye subpixels, wherein the locations of the contact holes in the first pixel and the second pixel are different and the locations of the contact holes in the third pixel and the fourth pixel are different, and the locations of the contact holes in the first pixel and the third pixel are different and the locations of the contact holes in the second pixel and the fourth pixel are different;

a first light modulating element formed on the first pixel and the third pixel; and a second light modulating element formed on the second pixel and the fourth pixel.

8. The pixel structure of a 3D display device as claimed in claim 7, wherein two of the contact holes of each of the first subpixel strip, the fourth subpixel strip, the sixth subpixel strip and the seventh subpixel strip and one of the contact holes of each of the second subpixel strip, the third subpixel strip, the fifth subpixel strip and the eighth subpixel strip are located in the second area of the subpixels, and two of the contact holes of each of the second subpixel strip, the third subpixel strip, the fifth subpixel strip and the eighth subpixel strip and one of the contact holes of each of the first subpixel strip, the fourth subpixel strip, the sixth subpixel strip and the seventh subpixel strip are located in the first area of the subpixels.

9. The pixel structure of a 3D display device as claimed in claim 7, wherein the contact holes of the first subpixel strip, the fourth subpixel strip, the sixth subpixel strip and the seventh subpixel strip are located in the second area of the subpixels, and the contact holes of the second subpixel strip, the third subpixel strip, the fifth subpixel strip and the eighth subpixel strip are located in the first area of the subpixels.

* * * * *